(12) United States Patent
He

(10) Patent No.: US 8,869,096 B2
(45) Date of Patent: Oct. 21, 2014

(54) REQUIREMENT MANAGEMENT METHOD AND APPARATUS

(71) Applicant: Huawei Technologies Co., Ltd., Guangdong (CN)

(72) Inventor: Yungu He, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 128 days.

(21) Appl. No.: 13/686,029

(22) Filed: Nov. 27, 2012

(65) Prior Publication Data

US 2013/0212552 A1 Aug. 15, 2013

Related U.S. Application Data

(63) Continuation of application No. PCT/CN2012/078978, filed on Jul. 20, 2012.

(30) Foreign Application Priority Data

Feb. 14, 2012 (CN) .......................... 2012 1 0032713

(51) Int. Cl.
*G06F 9/44* (2006.01)
*G06Q 10/06* (2012.01)

(52) U.S. Cl.
CPC ...................................... *G06F 8/10* (2013.01); *G06Q 10/06395* (2013.01)
USPC ............................ 717/101; 717/104; 717/123

(58) Field of Classification Search
None
See application file for complete search history.

(56) References Cited

U.S. PATENT DOCUMENTS

| 7,962,891 | B2 * | 6/2011 | Kimelman et al. | ............ 717/104 |
| 8,191,044 | B1 * | 5/2012 | Berlik et al. | ................... 717/124 |
| 8,327,318 | B2 * | 12/2012 | Chaar et al. | .................... 717/123 |
| 8,359,566 | B2 * | 1/2013 | Chaar et al. | .................... 717/123 |
| 8,370,188 | B2 * | 2/2013 | Bernardini et al. | .......... 705/7.13 |

(Continued)

FOREIGN PATENT DOCUMENTS

| CN | 1464399 | A | 12/2003 |
| CN | 1506892 | A | 6/2004 |
| CN | 101320329 | A | 12/2008 |
| JP | 2000056812 | A | 2/2000 |

OTHER PUBLICATIONS

Cleland-Huang et al., "Automated Classification of Non-Functional Requirements", 2007 Springer-VErlag London, Mar. 23, 2007, pp. 103-120; <http://link.springer.com/article/10.1007%2Fs00766-007-0045-1>.*

(Continued)

*Primary Examiner* — Thuy Dao
*Assistant Examiner* — Ben C Wang
(74) *Attorney, Agent, or Firm* — Conley Rose, P.C.; Grant Rodolph; Nicholas K. Beaulieu

(57) ABSTRACT

Embodiments of the present invention provide a requirement management method and apparatus. The method mainly includes: dividing all requirements of a system into layers from top to bottom according to a service object, a value and granularity of every requirement; obtaining a direct progress rate of any requirement in the system; obtaining direct progress rates of all lower-layer requirements of the any requirement; and calculating a mean of direct progress rates of all the lower-layer requirements to obtain a verification progress rate of the any requirement, and performing a weighting operation on the direct progress rate and the verification progress rate of the any requirement to obtain a progress rate of the any requirement.

18 Claims, 6 Drawing Sheets

(56) References Cited

U.S. PATENT DOCUMENTS

| | | | |
|---|---|---|---|
| 8,418,126 B2* | 4/2013 | Chaar et al. | 717/104 |
| 8,464,205 B2* | 6/2013 | Chaar et al. | 717/123 |
| 8,566,777 B2* | 10/2013 | Chaar et al. | 717/101 |
| 8,645,904 B2* | 2/2014 | Coldicott et al. | 717/104 |
| 8,726,227 B2* | 5/2014 | Adhikary et al. | 717/104 |
| 2005/0149917 A1* | 7/2005 | Brown | 717/144 |
| 2006/0174222 A1* | 8/2006 | Thonse et al. | 717/106 |
| 2008/0256506 A1* | 10/2008 | Chaar et al. | 717/101 |
| 2008/0256507 A1* | 10/2008 | Chaar et al. | 717/101 |
| 2008/0263505 A1* | 10/2008 | StClair et al. | 717/106 |
| 2008/0270210 A1* | 10/2008 | Kratschmer et al. | 705/7 |
| 2008/0320482 A1 | 12/2008 | Dawson et al. | |
| 2009/0119637 A1* | 5/2009 | Ganapathy | 717/101 |
| 2009/0259682 A1* | 10/2009 | Baldwin et al. | 707/103 R |
| 2009/0300577 A1* | 12/2009 | Bernardini et al. | 717/101 |
| 2010/0017792 A1* | 1/2010 | Young et al. | 717/162 |
| 2010/0023918 A1* | 1/2010 | Bernardini et al. | 717/101 |
| 2010/0023919 A1* | 1/2010 | Chaar et al. | 717/101 |
| 2010/0031226 A1* | 2/2010 | Chaar et al. | 717/101 |
| 2010/0125618 A1* | 5/2010 | Dutta et al. | 707/822 |
| 2011/0184689 A1* | 7/2011 | Awedikian et al. | 702/123 |
| 2012/0144363 A1* | 6/2012 | Bernardini et al. | 717/101 |
| 2013/0014079 A1* | 1/2013 | Chaar et al. | 717/101 |
| 2013/0254738 A1* | 9/2013 | Chaar et al. | 717/101 |
| 2014/0143749 A1* | 5/2014 | Liang et al. | 717/101 |

OTHER PUBLICATIONS

Cleland-Huang et al., "Goal-Centric Traceability for Managing Non-Functional Requirements", 2004 ACM, ICSE'05, May 15-21, 2005, St. Louis, Missouri, pp. 362-371; <http://dl.acm.org/citation.cfm?id=1062455.1062525&coll=DL&dl=GUIDE&CFID=400009053&CFTOKEN=90567657>.*

Cleland-Huang et al., "The Detection and Classification of Non-Functional Requirements with Application to Early Aspects", 2006 IEEE, RE'06, pp. 1-10; <http://ieeexplore.ieee.org/stamp/stamp.jsp?tp=&arnumber=1704047>.*

Nick Martens, "The impact of non-functional requirements on project success", Apr. 2011, IKU-0255300, Utrecht University, Nederlands, pp. 1-101; <http://www.cs.uu.nl/education/scripties/pdf.php?SID=INF/SCR-2010-038>.*

Loucopoulos et al., "A Systematic Classification and Analysis of NFRs", Proceedings of the Nineteenth Americas Conference on Information Systems, Chicago, Illinois, Aug. 15-17, 2013, pp. 1-10; <https://www.escholar.manchester.ac.uk/uk-ac-man-scw:193950>.*

Foreign communication from a counterpart application, PCT Application PCT/CN2012/078978, International Search Report, Dated Nov. 15, 2012, 12 pages.

\* cited by examiner

| Service Category | Service Class | Service Subclass |
|---|---|---|
| Product Delivery Category | Supply Chain | Design for Postponement |
| | | Design for Postponement |
| | | Design for Manufacturability |
| | | Design for Assembly |
| | | Design for Logistics |
| | | Design for Availability |
| | | Design for diagnosis |
| | | Design for Testability |
| | | Design for Repair |

FIG. 5

REQUIREMENT MANAGEMENT METHOD AND APPARATUS

CROSS-REFERENCE TO RELATED APPLICATIONS

This application is a continuation of International Application No. PCT/CN2012/078978, filed on Jul. 20, 2012, which claims priority to Chinese Patent Application No. 201210032713.7, filed on Feb. 14, 2012, both of which are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to the field of computer application technologies, and in particular, to a requirement management method and apparatus.

BACKGROUND

With the development of telecommunications and the Internet, various software and hardware systems become more and more complex, and requirements for the systems also become more and more diversified. To ensure high efficiency of the system, end-to-end (E2E) management of the complex requirements is needed, so as to guarantee complete requirements and prevent distortion or loss during transfer of requirements.

From the perspective of completeness of requirements, requirements of a user for a product are generally classified into two types: one is functional requirements, and the other is non-functional requirements. The functional requirements for the product refer to functions that the product needs to provide; and the non-functional requirements for the product refer to features, except the functional requirements, that the product should have in order to meet user service requirements, such as performance, reliability, maintainability, extensibility, and adaptability to technologies and to services. With the development and maturity of industrial standards, functions have become homogeneous among products, and with the continuous progress and popularization of technologies, availability of key technologies for implementing the functions is no longer a barrier; therefore, a competitive difference between products is embodied mainly in a difference in the non-functional aspect, and requirements of the user in the non-functional aspect are attracting more and more attention. During a process of practical research and development of the product, it is not enough to only meet the functional requirements, but professional division and management of the requirements is also needed. Major operators, equipment vendors and suppliers in the industry have corresponding requirement classification and management methods, where a common method is Design for X (DFX) classification method, which is also known as design for attribute classification method. For DFX, it is already systematically considered at the beginning of the design how to implement attributes of competitive non-functional requirements, so as to improve product quality and competitiveness. Existing DFX classification is shown in Table 1 below:

| Serial Number | Abbreviation | Full Name in English | Full Name in Chinese |
|---|---|---|---|
| 1 | DFAs | Design for Assembly | 可装配性设计 |
| 2 | DFA | Design for Availability | 可用性设计 |
| 3 | DFC | Design for Compatibility | 兼容性设计 |
| 4 | DFCp | Design for Compliance | 顺从性设计 |
| 5 | DFCS | Design for Component Substitute | 可替代性设计 |
| 6 | DFD | Design for Deployment | 可部署性设计 |
| 7 | DFDg | Design for Diagnosability | 可诊断性设计 |
| 8 | DFEE&E | Design for Energy Efficiency and Environment | 能效与环境设计 |
| 9 | DFEn | Design for Environment | 环境设计 |
| 10 | DFE | Design for Extensibility | 可扩展性设计 |
| 11 | DFEE | Design for Energy Efficiency | 能效设计 |
| 12 | DFF | Design for Flexibility | 灵活性设计 |
| 13 | DFG | Design for Globalization | 国际化设计 |
| 14 | DFI | Design for Interoperability | 互操作性设计 |
| 15 | DFL | Design for Logistics | 物流设计 |
| 16 | DFMt | Design for Maintainability | 可维护性设计 |
| 17 | DFM | Design for Manufacturability | 可制造性设计 |
| 18 | DFPt | Design for Portability | 可移植性设计 |
| 19 | DFP | Design for Performance | 性能设计 |
| 20 | ... | | |

The foregoing DFX classification method involves a large number of scattered categories, among which a relationship cannot be recognized. As a result, management and design of quality attributes of non-functional requirements by directly using the foregoing DFX classification method is rather inefficient and cannot ensure completeness of the requirements.

SUMMARY

Embodiments of the present invention provide a requirement management method and apparatus to manage requirements of a system, so as to solve a problem of incomplete requirements and inefficient requirement management during a process of managing large-scale requirements.

A requirement management method includes: dividing all requirements of a system into layers from top to bottom according to a service object, a value and granularity of every requirement; obtaining a direct progress rate of any requirement in the system, where the direct progress rate is a progress rate tested by using a test case directly associated with the any requirement; obtaining a direct progress rate of each requirement of all lower-layer requirements of the any requirement, where the direct progress rate of each requirement is a progress rate tested by using a test case directly associated with each requirement; and calculating a mean of direct progress rates of all the lower-layer requirements to obtain a verification progress rate of the any requirement, and performing a weighting operation on the direct progress rate and the verification progress rate of the any requirement to obtain a progress rate of the any requirement.

An embodiment of the present invention further provides a requirement management apparatus, including: a requirement dividing module configured to divide all requirements of a system into layers from top to bottom according to a service object, a value and granularity of every requirement; a first direct progress rate obtaining module configured to obtain a direct progress rate of any requirement in the system, where the direct progress rate is a progress rate tested by using a test case directly associated with the any requirement; a second direct progress rate obtaining module configured to obtain a direct progress rate of each requirement of all lower-layer requirements of the any requirement, where the direct progress rate of each requirement is a progress rate tested by using a test case directly associated with each requirement; and a requirement progress rate obtaining module configured to calculate a mean of direct progress rates of all the lower-layer requirements to obtain a verification progress rate of the any requirement and configured to perform a weighting operation on the direct progress rate and the verification progress rate of the any requirement to obtain a progress rate of the any requirement in the system.

In the embodiments of the present invention, through the foregoing technical solutions, all requirements of a system are divided into layers from top to bottom according to the service object, value and granularity of every requirement, so that progress rates of higher-layer requirements can be calculated automatically according to progress rates of lower-layer requirements; and by combining layered management and progress rate computation, tracing and management of requirements of a complex system become convenient and orderly, thereby reducing management costs.

BRIEF DESCRIPTION OF THE DRAWINGS

To illustrate technical solutions in embodiments of the present invention more clearly, accompanying drawings required for describing the embodiments are introduced briefly in the following. Apparently, the accompanying drawings in the following description merely show some embodiments of the present invention, and persons of ordinary skill in the art can derive other drawings from the accompanying drawings without creative efforts.

FIG. 5 is a schematic diagram of an architecture where multiple attribute fields in a requirement record are used to express three-layer service classification.

DETAILED DESCRIPTION

For ease of understanding of the embodiments of the present invention, several specific embodiments are described in detail in the following with reference to the accompanying drawings, where the embodiments are not intended to limit the embodiments of the present invention.

Embodiment 1

For ease of cooperation of different roles and hierarchical clarification of requirements, generally layered management of the requirements is carried out, so as to finally achieve an objective of fulfilling user requirements through decomposition and transfer of the requirements layer by layer.

Figure 1:
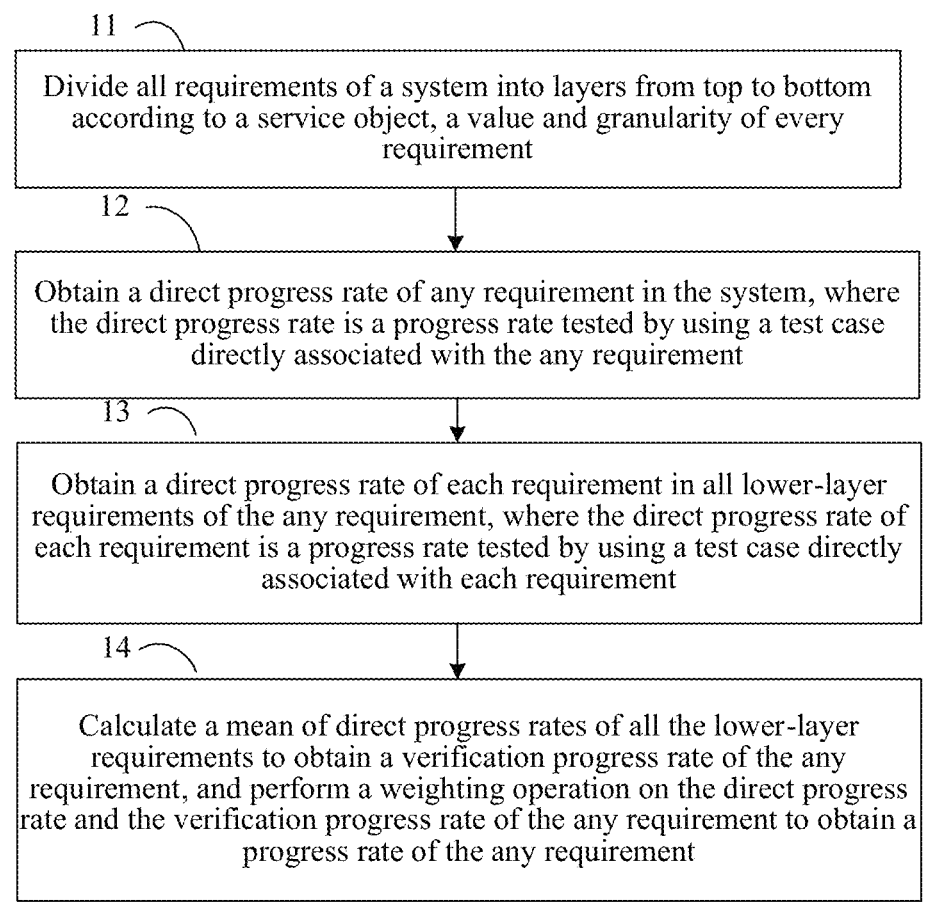
FIG. 1 is a processing flow chart of a requirement management method according to embodiment 1 of the present invention.

An embodiment of the present invention provides a requirement management method. As shown in FIG. 1, the method includes the following processing steps:

Step 11: Divide all requirements of a system into layers from top to bottom according to a service object, a value and granularity of every requirement.

Figure 2:
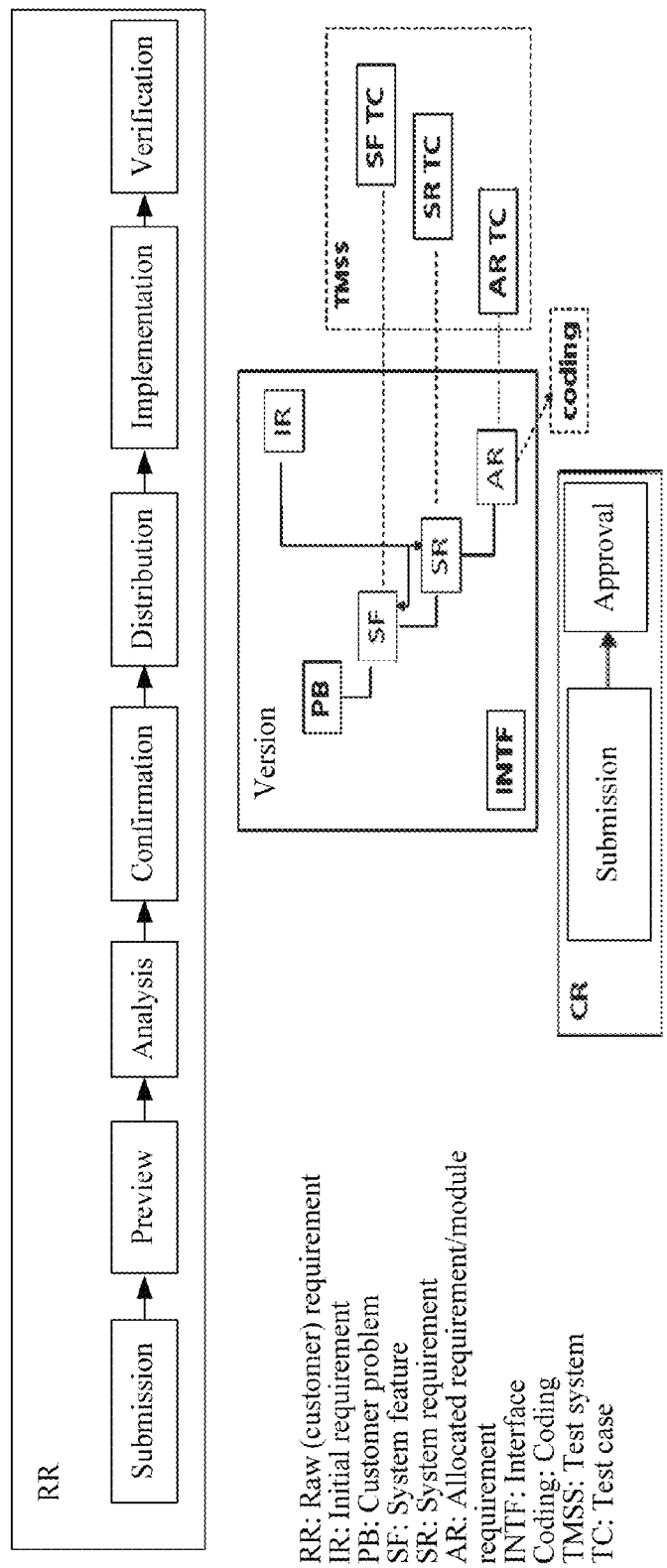
FIG. 2 is a schematic principle diagram of layered processing on requirements according to embodiment 1 of the present invention.

FIG. 2 is a schematic principle diagram of layered processing of requirements according to the embodiment of the present invention. All the requirements of the system are divided into 4 layers from top to bottom according to the service object, value and granularity of every requirement: a user problem (PB) layer, an system feature (SF) layer, a system requirement (SR) layer, and an allocated requirement (AR) layer, where the PB layer is the highest layer, the SF layer is subordinate to the PB layer, the SR layer is subordinate to the SF layer, and the AR layer is subordinate to the SR layer. PB, SF, SR, and AR embody hierarchical decomposition and segmentation of the requirements, a tracing relationship exists between the requirements from top to bottom, and requirements of part of the layers may be tested independently.

The PB layer is a requirement embodying a special concern of a user service, the SF layer is a requirement which is of a great value and is provided by the system to solve a user problem, the SR layer is all functional and non-functional requirements provided by the system externally, and the AR layer is requirements which are obtained by decomposing system requirements and are allocated to a subsystem or module level. In the embodiment of the present invention, RR, PB, SF, SR, AR and so on are names of requirements of different layers, and in practical application and implementation, these names may not be used, but instead, abstract names such as L1, L2, . . . , Ln may be used.

It should be noted that the system described in all embodiments of the present invention refers to an object to be researched and developed and to be delivered and sold, which is a relative concept, and may be a solution, a specific product (network element) or a separately delivered platform.

For test verification, system-level test verification is mainly for a requirement of the SR layer, and unit-level test verification is mainly for a requirement of the AR layer; in addition, acceptance testing by a user is generally for a requirement of the SF layer.

Step 12: Obtain a direct progress rate of any requirement in the system, where the direct progress rate is a progress rate tested by using a test case directly associated with the any requirement.

The embodiment of the present invention proposes a concept of a progress rate of any requirement in the system, where a progress rate of a requirement embodies test progress of the requirement.

The progress rate of the any requirement in the system includes a direct progress rate and a verification progress rate. The direct progress rate is a progress rate tested by using a test case directly associated with the any requirement. As shown in FIG. 2, a requirement of every layer is associated with a test case (e.g., SF TC, SR TC, and AR TC as shown in FIG. 2), which is used for testing a completion status of every requirement, that is, the direct progress rate. Based on an operating status of a test case directly associated with a requirement, the direct progress rate of the requirement can be obtained. The verification progress rate is a progress rate obtained by calculating a mean of direct progress rates of all lower-layer requirements of any requirement. The direct progress rate and the verification progress rate both can embody a completion status of a requirement to a certain extent, but not accurately enough.

Step 13: Obtain a direct progress rate of each requirement of all lower-layer requirements of the any requirement.

Specifically, by obtaining an operating status of a test case directly associated with each requirement of all the lower-layer requirements of the any requirement in the system, the direct progress rate of each requirement of all the lower-layer requirements of the any requirement may be determined based on the operating status.

Step 14: Calculate a mean of direct progress rates of all the lower-layer requirements to obtain a verification progress rate of the any requirement, and perform a weighting operation on the direct progress rate and the verification progress rate of the any requirement to obtain a progress rate of the any requirement.

The verification progress rate represents a comprehensive result of test progress of the direct progress rates of all the lower-layer requirements of the any requirement. The mean of the direct progress rates of all the lower-layer requirements is calculated to obtain the verification progress rate of the any requirement, and the weighting operation is performed on the direct progress rate and the verification progress rate of the any requirement according to corresponding weights, to obtain the progress rate of the any requirement.

It should be noted that the direct progress rate and the verification progress rate both can embody a completion status of a requirement to a certain extent, but not accurately enough, and not in the optimal form; in view of this, in the embodiment of the present invention, a progress rate of a requirement is obtained more accurately through a weighting operation performed on a direct progress rate and a verification progress rate.

Specifically, in an embodiment, it is assumed that a requirement F of an Lm layer includes n lower-layer requirements F1 to Fn, for example, the requirement F of the Lm layer is SF1, and SF1 includes n SRs (SR1–SRn).

A verification progress rate F_VerificationProgressRate of the requirement F is calculated according to an equation:

$$F\_VerificationProgressRate = (F1\_ProgressRate + \ldots + Fn\_ProgressRate)/n.$$

A progress rate F_ProgressRate of the requirement F is calculated according to an equation:

$$F\_ProgressRate = F\_DirectProgressRate * X + F\_VerificationProgressRate * (1-X).$$

Here, F_DirectProgressRate is a direct progress rate of the requirement F tested by using a test case directly associated with the requirement F, F1_ProgressRate is a direct progress rate of the requirement F1, Fn_ProgressRate is a direct progress rate of the requirement Fn, and X is a weight of a direct verification progress rate of SF1 participating in calculation and has a value range of $0 \leq X \leq 1$, where in an embodiment, X may be set to 0.9, and in another embodiment, X may be set to 0.8.

Specifically, a requirement management tool may use two attributes/fields to record progress of each requirement, for example, the two fields are named verification progress rate and direct verification progress rate, where the verification progress rate field is used for storing a progress rate finally calculated for the requirement (e.g., F_ProgressRate described above), and the direct verification progress rate field is used for storing a progress rate field (e.g., F_DirectProgressRate described above) fed back by a test system after testing the requirement using a test case directly associated with the requirement. After the progress rates of all the lower-layer requirements are calculated, calculation of a progress rate of an upper-layer requirement is automatically triggered, till the topmost layer.

Because an upper-layer requirement is decomposed into many lower-layer requirements, adjustment may be frequent. In this case, if the foregoing equation is directly used for calculation, real-time performance is poor. Therefore, the equation is further improved by using an incremental calculation method, which is specifically as follows:

Two attributes are added to each requirement: a progress rate old value and a direct progress rate old value, for recording values of a progress rate and a direct progress rate after a last change. A specific method for calculating a progress rate of a requirement is:

(1) if a direct progress rate of a lower-layer requirement (e.g., F1) of the requirement F changes, first calculating a progress rate F1_ProgressRate of F1 according to an equation: F1_ProgressRate=F1_ProgressRateOldValue+ (F1_DirectProgressRate F1_DirectProgressRateOldValue) *Y, and then calculating the progress rate F_ProgressRate of the requirement F according to an equation: F_ProgressRate=F_ProgressRateOldValue+ (F1_ProgressRate−F1_ProgressRateOldValue)*(1−X)/n, where F1_ProgressRateOldValue is a progress rate of F1 before change, F1_DirectProgressRateNewValue is a direct progress rate of F1 after change, F1_DirectProgressRateOldValue is a direct progress rate of F1 before change, Y is a set weight and has a value range of $0 \leq Y \leq 1$, and F_ProgressRateOldValue is a progress rate of F before the lower-layer requirement F1 changes;

(2) if the number of lower-layer requirements of the requirement F is increased from n to m, calculating F_ProgressRate after the change according to an equation: F_ProgressRate=(n*F_ProgressRateOldValue+(m−n) *F_DirectProgressRate*X+(F(n+1)_ProgressRate+ . . . +Fm_ProgressRate)*(1−X))/m, where F_ProgressRateOldValue is a direct progress rate of F before the number of lower-layer requirements changes, F_DirectProgressRate is a direct progress rate of F after the number of lower-layer requirements changes, and (F(n+1)_ProgressRate+ . . . +Fm_ProgressRate) represents an accumulated summation of progress rates of an $(n+1)^{th}$ requirement to an $m^{th}$ requirement in all the lower-layer requirements of F;

(3) if the number of lower-layer requirements of the requirement F is reduced from n to k, calculating F_ProgressRate after the change, according to an equation: F_ProgressRate=(−n*F_ProgressRateOldValue+(n−k) *F_DirectProgressRate*X+(F(k+1)_ProgressRate+ . . . +Fn_ProgressRate)*(1−X))/(−k).

Further, as shown in FIG. 1, step 11 further includes according to a full life cycle of the system which spans design, development, delivery to the user, system use of the user, and improvement of the system according to user feedback, classify non-functional attributes of requirements of every layer into three service classifications: a product delivery category, a product operation category and a product evolution category, where all requirements of every layer of the system include all service classifications of the different service classifications.

It should be noted that, non-functional requirements of the system refer to features, except functional requirements, that the system should have in order to meet user service requirements. The non-functional requirements of the system include performance, reliability, maintainability, extensibility, adaptability to technologies and to services of the system, and so on. Here, it can be seen that the non-functional requirements involve a wide range, and the system itself does not exist in isolation, but also involves many influences of an external environment. For the non-functional requirements, both applicability and usability of the system should be taken into consideration.

The product delivery category represents a requirement arising in a process from completion of system development to delivery of the system to a user, the product operation category represents a requirement arising in an operation and maintenance process after the system is delivered to the user, and the product evolution category represents a requirement arising in error correction, functional upgrading and product evolution processes of the system. Specifically, the requirement of the product delivery category of a product is used for improving end-to-end (e.g., bidding, plan prediction, procurement, configuration, manufacturing, packing and shipping, installation/commissioning/acceptance) delivery efficiency and quality, reducing delivery time, increasing an inventory turnover ratio, and lowering costs of procurement, manufacturing, delivery and deployment; the requirement of the product operation category is used for comprehensively meeting operation and maintenance requirements of the user during operation of the product, including reduction in occurrence of faults, reduction in impact of faults, fast recovery from faults, maximal reduction in vulnerability of assets and resources, improvement of resource utilization efficiency within the life cycle of the product, reduction in impact on the environment, and improvement of effectiveness and efficiency of product service; and the requirement of the product evolution category is used for enabling the system to flexibly adapt to different scenarios and requirements at present and in the future, including addition and removal of a feature/function, scaling of capacity and performance, evolution of a technology, migration of a platform, and so on.

Figure 3:
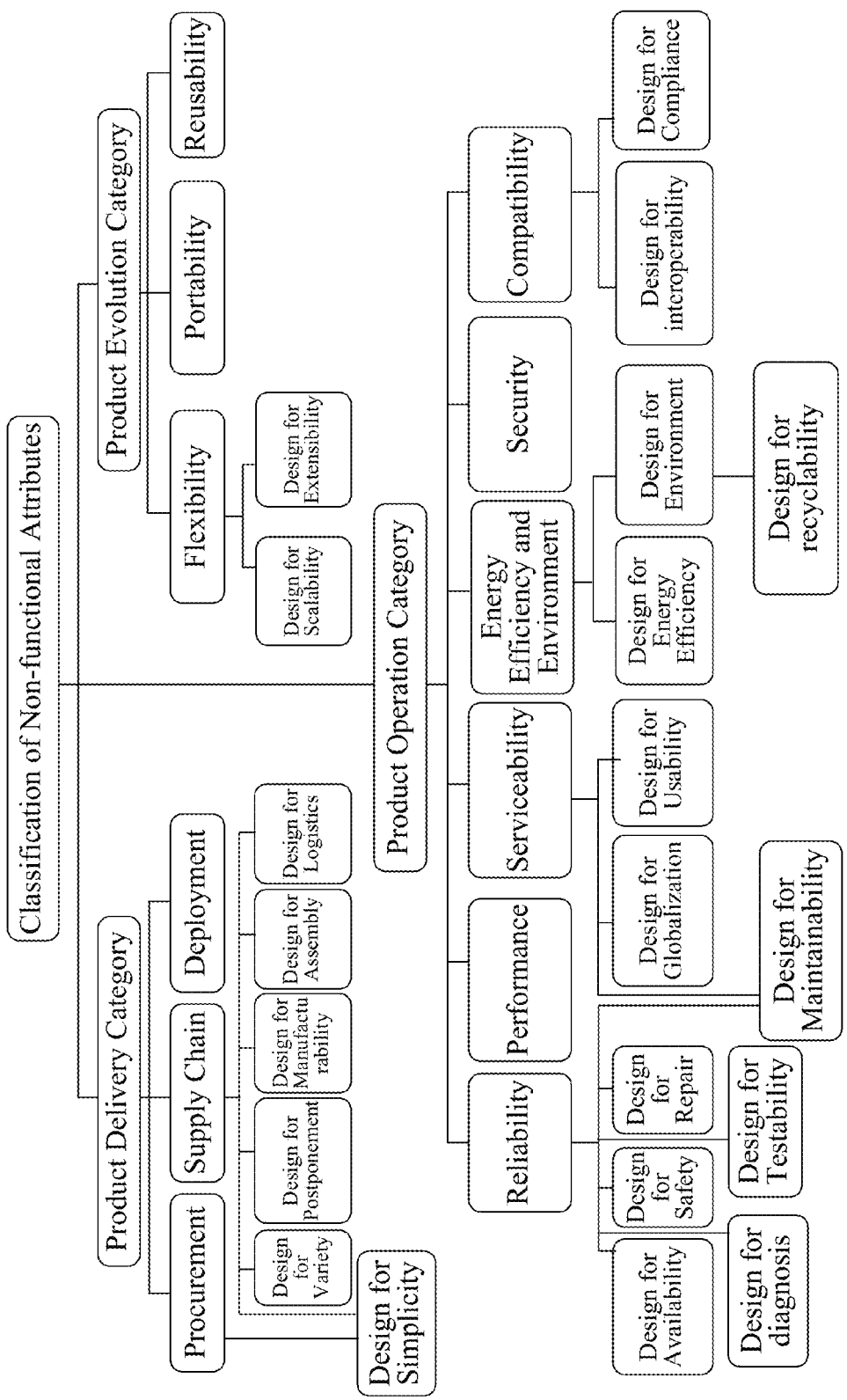
FIG. 3 is a schematic diagram of DFX service classifying and layering architecture according to embodiment 1 of the present invention.

Further, as shown in FIG. 3, the three service classifications may be further divided into more service classes.

The product delivery category includes the following service classes: a procurement class, a supply chain class, and a deployment class.

The product operation category includes the following service classes: a reliability (including testability) class, a performance class, a serviceability class, an energy efficiency and environment class, a security class, and a compatibility class.

The product evolution category includes the following service classes: a flexibility class, a mobility/portability class, and a reusability class.

Further, the foregoing service classes may further be divided into smaller service subclasses: a design for simplicity subclass, a design for variety subclass, a design for postponement subclass, a design for manufacturability subclass, a design for assembly subclass, a design for logistics subclass, a design for availability subclass, a design for diagnosability subclass, a design for testability subclass, a design for repair subclass, a design for personal safety subclass, a design for maintainability subclass, a design for globalization subclass, a design for usability subclass, a design for energy efficiency subclass, a design for environment subclass, a design for interoperability subclass, a design for compliance subclass, a design for scalability subclass, and a design for extensibility subclass.

For the service classes, service subclasses and specific classification names included by the service subclasses, adjustment such as addition, removal and renaming may be made according to a service development condition.

The foregoing multi-layer service classification constitutes a hierarchical framework of non-functional attributes of a solution DFX of the system and establishes a full life cycle DFX attribute model of the system. In a requirement management and design tool, one or more attribute fields in a requirement record are used to express and maintain such three-layer classification architecture of the requirements of the system.

Figure 4:
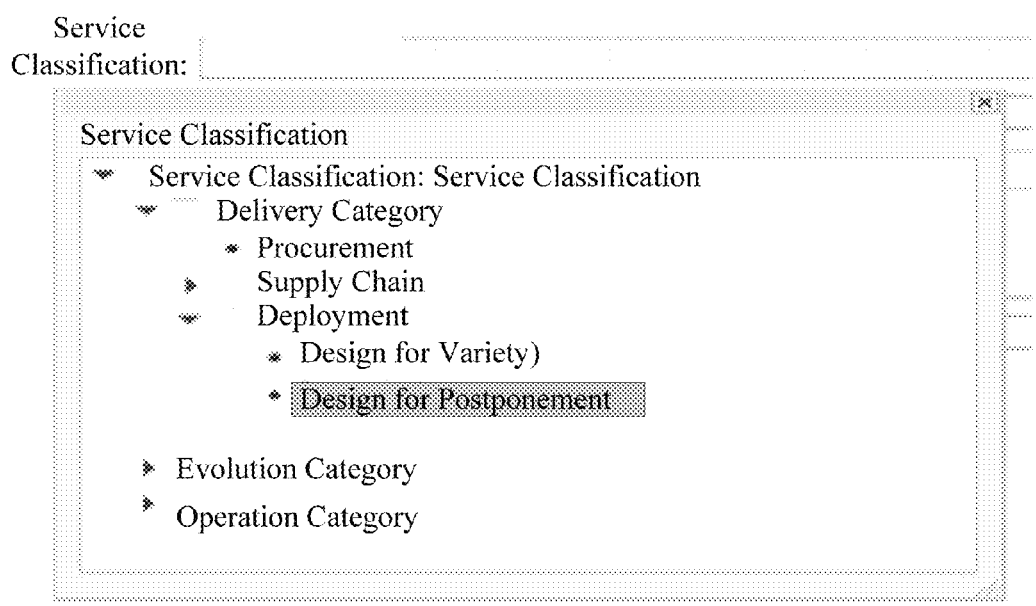
FIG. 4 is a schematic diagram of architecture where one attribute field in a requirement record is used to express three-layer service classification.

For example, as shown in FIG. 4, one attribute field is used, which is for example referred to as a service classification, including layer options to represent the foregoing three-layer classification architecture.

For another example, as shown in FIG. 5, multiple attribute fields are used: 3 fields are used for expression, which are for example referred to as a service category, a service class and a service subclass.

The service category includes the foregoing three service classifications: the product delivery category, the product operation category, and the product evolution category.

The service class is a service class obtained by dividing the foregoing three service classifications: procurement and so on.

The service subclass is a service subclass obtained by further dividing the foregoing service class: design for simplicity and so on.

Completeness of service classification of requirements is checked according to the foregoing one or more attribute fields, that is, it is checked whether the requirements of the system include all the service classifications of the foregoing three service categories.

For example, one system includes 5 requirements, belonging to the PB, SF or SR layer, and only the product delivery category, the product operation category and the product evolution category, that is, the 3 service classifications of a first layer of the foregoing three-layer service classification are used. Therefore, each requirement of the foregoing 5 requirements belongs to the product delivery category, the product operation category or the product evolution category, and the foregoing 5 requirements should include all the 3 service classifications, that is, the product delivery category, the product operation category and the product evolution category.

When all the service classifications of the three layers are used, the system will check, in a form of a tool or report, completeness of every requirement of all the requirements of the system, and if non-functional attributes of all the requirements of the system do not include all service classifications of the service classifications of every layer, send, to system management personnel, prompt information indicating failure of completeness check of the system to indicate that the requirements of the system fails in the completeness check. In this case, the system management personnel supplement the requirements of the foregoing system, so that the non-functional attributes of all the requirements of the system include all service classifications of the service classifications of every layer.

Further, the user is not only concerned about the test progress of the requirement, but is also concerned about end-to-end (E2E) progress of the requirement, that is, the user wants to know which phase the requirement is currently in.

In the embodiment of the present invention, after analysis of the requirement is completed, an E2E progress rate of the requirement is 20%.

After design of the requirement is completed, the E2E progress rate of the requirement is 40%.

After development (e.g., coding for software) of the requirement is completed, the E2E progress rate of the requirement is 70%, and during the development process, the E2E progress rate is 40 to 70%.

After test verification of the requirement is completed, the E2E progress rate of the requirement is 100%, and during the test process, the E2E progress rate is 70 to 100%.

The foregoing specific values such as 20%, 40% and 70% are only examples and may be adjusted and set as required in practical application and implementation.

Through the foregoing technical solution, the embodiment of the present invention provides a comprehensive, efficient requirement layering and classifying method, which solves a problem that the existing DFX classification method involves a large number of scattered categories, among which a relationship cannot be recognized, thereby improving quality and efficiency of requirement management and system design.

By checking completeness of service classification of the requirement, the embodiment of the present invention can better define and deliver the range of the system or product to be developed in the full life cycle of the product, which solves the problems of incomplete requirements and tracing omissions during the process of managing large-scale requirements in the prior art.

In the embodiment of the present invention, progress rates of higher-layer requirements can be calculated automatically according to progress rates of lower-layer requirements; and by combining layered management and progress rate computation, tracing and management of requirements of a complex system become convenient and orderly, thereby reducing management costs.

Embodiment 2

Figure 6:
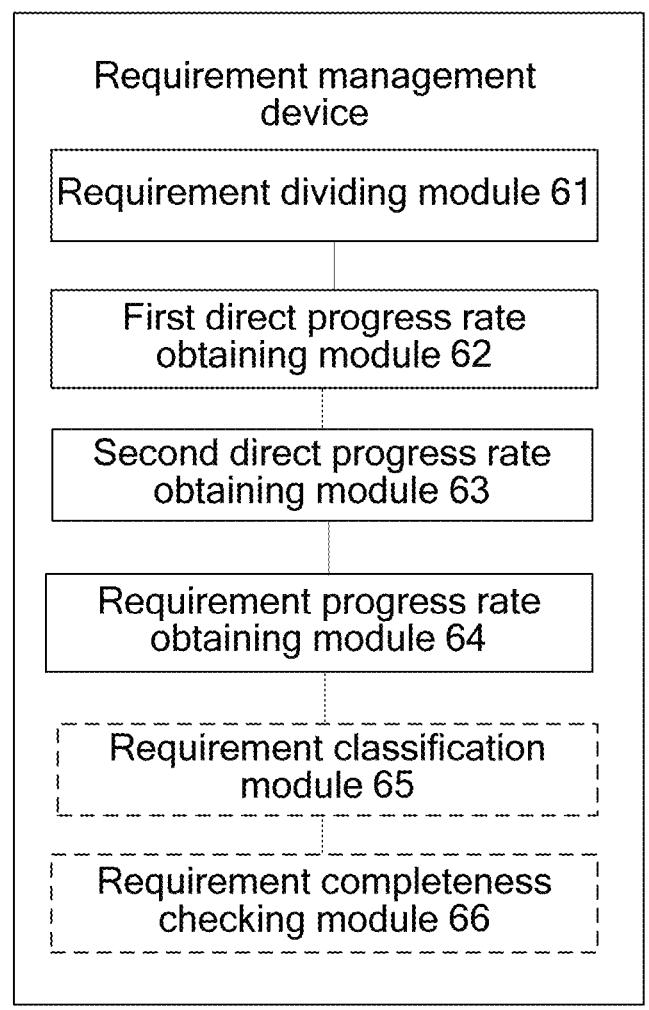
FIG. 6 is a specific structural diagram of a requirement management apparatus according to embodiment 2 of the present invention.

This embodiment provides a requirement management apparatus having a specific structure as shown in FIG. 6 and including the following modules: a requirement dividing module 61 configured to divide all requirements of a system into layers from top to bottom according to a service object, a value and granularity of every requirement, where specifically, the requirement dividing module 61 is specifically configured to divide all the requirements of the system into 4 layers from top to bottom: a user problem PB layer, a system feature SF layer, a system requirement SR layer and an allocated requirement AR layer, where the PB layer is the highest layer, the SF layer is subordinate to the PB layer, the SR layer is subordinate to the SF layer, and the AR layer is subordinate to the SR layer; the PB layer is a requirement embodying a special concern of a user service, the SF layer is a requirement which is of a great value and is provided by the system to solve a user problem, the SR layer is all functional and non-functional requirements provided by the system externally, and the AR layer is requirements which are obtained by decomposing system requirements and are allocated to a subsystem or module level; a first direct progress rate obtaining module 62 configured to obtain a direct progress rate of any requirement in the system, where the direct progress rate is a progress rate tested by using a test case directly associated with the any requirement; a second direct progress rate obtaining module 63 configured to obtain direct progress rates of all lower-layer requirements of the any requirement; and a requirement progress rate obtaining module 64 configured to calculate a mean of direct progress rates of all the lower-layer requirements to obtain a verification progress rate of the any requirement and perform a weighting operation on the direct progress rate and the verification progress rate of the any requirement to obtain a progress rate of the any requirement in the system.

Specifically, for a working process of the requirement progress rate obtaining module 64, reference may be made to step 14 in embodiment 1 of the present invention, so that the details will not be described herein again.

Further, the apparatus may further include: a requirement classification module 65 configured to classify, according to a full life cycle of the system, non-functional attributes of requirements of every layer into three service classifications: a product delivery category, a product operation category and a product evolution category, where all requirements of every layer of the system include all service classifications of the different service classifications.

The product delivery category represents a requirement arising in a process from completion of system development to delivery of the system to a user, the product operation category represents a requirement arising in an operation and maintenance process after the system is delivered to the user, and the product evolution category represents a requirement arising in error correction, functional upgrading and product evolution processes of the system. Specifically, the requirement of the product delivery category of a product is used for improving end-to-end (e.g., bidding, plan prediction, purchasing, configuration, manufacturing, packing and shipping, installation/commissioning/acceptance) delivery efficiency and quality, reducing delivery time, increasing an inventory turnover ratio, and lowering costs of procurement, manufacturing, delivery and deployment; the requirement of the product operation category is used for comprehensively meeting operation and maintenance requirements of the user during operation of the product including reduction in occurrence of faults, reduction in impact of faults, fast recovery from faults, maximal reduction in vulnerability of assets and resources, improvement of resource utilization efficiency within the life cycle of the product, reduction in impact to the environment, and improvement of effectiveness and efficiency of the product service; and the requirement of the product evolution category is used for enabling the system to flexibly adapt to different scenarios and requirements at present and in the future including addition and removal of a feature/function, scaling of capacity and performance, evolution of a technology, migration of platform, and so on.

Further, as shown in FIG. 3, the three service classifications may be further divided into more service classes:

The product delivery category includes the following service classes: a procurement class, a supply chain class, and a deployment class.

The product operation category includes the following service classes: a reliability (including testability) class, a performance class, a serviceability class, an energy efficiency and environment class, a security class, and a compatibility class.

The product evolution category includes the following service classes: a flexibility class, a mobility/portability class, and a reusability class.

Further, the foregoing service classes may further be divided into smaller service subclasses: a design for simplicity subclass, a design for variety subclass, a design for postponement subclass, a design for manufacturability subclass, a design for assembly subclass, a design for logistics subclass, a design for availability subclass, a design for diagnosability subclass, a design for testability subclass, a design for repair subclass, a design for personal safety subclass, a design for maintainability subclass, a design for globalization subclass, a design for usability subclass, a design for energy efficiency subclass, a design for environment subclass, a design for interoperability subclass, a design for compliance subclass, a design for scalability subclass, and a design for extensibility subclass.

For the service classes, service subclasses and specific classification names included by the service subclasses, adjustment such as addition, removal and renaming may be made according to a service development status.

Further, as shown in FIG. 6, the requirement management apparatus provided by the embodiment of the present invention may further include: a requirement completeness checking module 66 configured to check completeness of each requirement of all the requirements of the system, and if non-functional attributes of all the requirements of the system do not include all service classifications of every service classification, send prompt information to indicate that the requirements of the system fails in the completeness check.

A specific processing process of requirement management performed by using the apparatus in the embodiment of the present invention is the same as the processing process of the foregoing method, so the details are not described herein again.

Persons of ordinary skill in the art should understand that all or part of the procedures of the methods in the foregoing embodiments may be implemented by a computer program instructing relevant hardware. The program may be stored in a computer readable storage medium. When the program is run, the procedures of each of the foregoing method embodiments are performed. The storage medium may be a magnetic disk, an optical disk, a read-only memory (ROM), a random access memory (RAM) or the like.

In conclusion, the embodiments of the present invention provide a comprehensive, efficient requirement layering and classifying method, which solves a problem that an existing DFX classification method involves a large number of scattered categories, among which a relationship cannot be recognized. An E2E requirement management process is implemented through a layering and classifying mechanism, quality and efficiency of requirement management and system design are improved.

In the embodiment of the present invention, by checking completeness of service classifications of requirements, a range of a system or product to be developed can be better defined and delivered in the full life cycle of the product, which solves problems such as incomplete requirements and tracing omissions during a process of managing large-scale requirements in the prior art, thereby further satisfying all-dimensional demands of customers and improving competitiveness of the product.

In the embodiment of the present invention, progress rates of higher-layer requirements can be calculated automatically according to progress rates of lower-layer requirements; and by combining layered management and progress rate computation, tracing and management of requirements of a complex system become convenient and orderly, thereby reducing management costs.

The foregoing descriptions are merely exemplary specific implementation manners of the present invention, but not intended to limit the present invention. Any variation or replacement that can be easily figured out by persons skilled in the art within the technical scope of the present invention shall fall within the protection scope of the present invention. Therefore, the protection scope of the present invention shall be subject to the claims.

What is claimed is:

1. A requirement management method executed by a processor, comprising:
dividing all requirements of a system into layers from top to bottom according to a service object, a value and granularity of every requirement;
obtaining a direct progress rate of one of the requirements in the system, wherein the direct progress rate is a progress rate tested by using a test case directly associated with the one requirement;
obtaining a direct progress rate of each requirement of all lower-layer requirements of the one requirement, wherein the direct progress rate of each requirement is a progress rate tested by using a test case directly associated with each requirement;
calculating a mean of direct progress rates of all the lower-layer requirements to obtain a verification progress rate of the one requirement; and
performing a weighting operation on the direct progress rate and the verification progress rate of the one requirement to obtain a progress rate of the one requirement,
wherein the progress rate of the one requirement is calculated according to an equation:

$$F\_ProgressRate = F\_DirectProgressRate * X + F\_VerificationProgressRate * (1-X),$$

wherein F_ProgressRate is the progress rate of the one requirement, F_DirectProgressRate is the direct progress rate, F_VerificationProgressRate is the verification progress rate, and X is a set weight.

2. The requirement management method according to claim 1, wherein dividing all requirements of a system into layers from top to bottom according to a service object, a value and granularity of every requirement comprises:
dividing all the requirements of the system into 4 layers that include a user problem (PB) layer, a system feature (SF) layer, a system requirement (SR) layer and an allocated requirement (AR) layer,
wherein the PB layer is the highest layer, the SF layer is subordinate to the PB layer, the SR layer is subordinate to the SF layer, and the AR layer is subordinate to the SR layer,
wherein the PB layer is a requirement embodying a special concern of a user service,
wherein the SF layer is a requirement which is of a great value and is provided by the system to solve a user problem,
wherein the SR layer is all functional and non-functional requirements provided by the system externally, and
wherein the AR layer is requirements which are obtained by decomposing system requirements and are allocated to a subsystem or module level.

3. The requirement management method according to claim 1, wherein after dividing all requirements of a system into layers from top to bottom according to a service object, a value and granularity of every requirement, the method further comprises:
classifying, according to a full life cycle of the system, non-functional attributes of the requirements of every layer into three service classifications that include a product delivery category, a product operation category and a product evolution category,
wherein the product delivery category represents a requirement arising in a process from completion of system development to delivery of the system to a user,
wherein the product operation category represents a requirement arising in an operation and maintenance process after the system is delivered to the user,
wherein the product evolution category represents a requirement arising in error correction, functional upgrading and product evolution processes of the system, and
wherein each requirement of every layer corresponds to one service classification of the three service classifications, and all the requirements of every layer of the system comprise all service classifications of the different service classifications.

4. The requirement management method according to claim 3, wherein after classifying non-functional attributes of requirements of every layer into three service classifications, the method further comprises checking completeness of every requirement of all the requirements of the system, and if the non-functional attributes of all the requirements of the system do not comprise all service classifications of the three service classifications, sending prompt information to indicate that the requirements of the system fails in the completeness check.

5. A requirement management method executed by a processor, comprising:
dividing all requirements of a system into layers from top to bottom according to a service object, a value and granularity of every requirement;
obtaining a direct progress rate of one of the requirements in the system, wherein the direct progress rate is a progress rate tested by using a test case directly associated with the one requirement;
obtaining a direct progress rate of each requirement of all lower-layer requirements of the one requirement, wherein the direct progress rate of each requirement is a progress rate tested by using a test case directly associated with each requirement;
calculating a mean of direct progress rates of all the lower-layer requirements to obtain a verification progress rate of the one requirement; and
performing a weighting operation on the direct progress rate and the verification progress rate of the one requirement to obtain a progress rate of the one requirement,
wherein calculating a mean of direct progress rates of all the lower-layer requirements to obtain a verification progress rate of the one requirement and performing a weighting operation on the direct progress rate and the verification progress rate of the one requirement to obtain a progress rate of the one requirement comprises:
calculating the verification progress rate F_VerificationProgressRate of the one requirement F according to an equation:

$$F\_VerificationProgressRate = \frac{\sum_{i=1}^{n} F_i\_ProgressRate}{n}; \text{ and}$$

calculating the progress rate F_ProgressRate of the one requirement F according to an equation:

$$F\_ProgressRate = F\_DirectProgressRate * X + F\_VerificationProgressRate * (1-X),$$

wherein n is the number of all the lower-layer requirements of the one requirement F, $F_i$ is an $i^{th}$ requirement of all the lower-layer requirements of the one requirement F, F_DirectProgressRate is the direct progress rate of F tested by using the test case directly associated with F, $F_i\_ProgressRate$ is a direct progress rate of $F_i$, and X is a set weight and has a value range of 0<=X<=1.

6. The requirement management method according to claim 5, further comprising:
after a direct progress rate of a lower-layer requirement $F_1$ of the one requirement F changes, calculating a progress rate $F_1\_ProgressRate$ of $F_1$ according to an equation:

$$F_1\_ProgressRate = F_1\_ProgressRateOldValue + (F_1\_DirectProgressRateNewValue - F_1\_DirectProgressRateOldValue) * Y, \text{ and}$$

calculating the progress rate F_ProgressRate of the one requirement F according to an equation:

$$F\_ProgressRate = F\_ProgressRateOldValue + (F_1\_ProgressRate - F_1\_ProgressRateOldValue) * (1-X)/n,$$

wherein $F_1\_ProgressRateOldValue$ is a progress rate of $F_1$ before change, $F_1\_DirectProgressRateNewValue$ is a direct progress rate of $F_1$ after change, $F_1\_DirectProgressRateOldValue$ is a direct progress rate of $F_1$ before change, Y is a set weight and has a value range of 0<=Y<=1, and F_ProgressRateOldValue is a progress rate of F before the lower-layer requirement $F_1$ changes; or when the number of lower-layer requirements of the one requirement F is increased from n to m, calculating a progress rate F_ProgressRate of F after the number of lower-layer requirements changes, according to an equation:

$$F\_ProgressRate = \left( n * F\_progressRateOldValue + (m-n) * F\_DirectProgressRate * X + (1-X) * \sum_{i=n+1}^{m} F_i\_ProgressRate \right) \Big/ m,$$

wherein F_ProgressRateOldValue is a direct progress rate of F before the number of lower-layer requirements changes, F_DirectProgressRate is a direct progress rate of F after the number of lower-layer requirements changes, and $F_i\_ProgressRate$ is a progress rate of the $i^{th}$ requirement of all the lower-layer requirements of the one requirement F; or when the number of lower-layer requirements of the requirement F is reduced from n to k, calculating a progress rate F_ProgressRate of F after the number of lower-layer requirements changes, according to an equation:

$$F\_ProgressRate = \left( -n * F\_ProgressRateOldValue + (n-k) * F\_DirectProgressRate * X + (1-X) * \sum_{i=k+1}^{n} F_i\_Progress \right) \Big/ (-k).$$

7. The requirement management method according to claim 5, wherein dividing all requirements of a system into layers from top to bottom according to a service object, a value and granularity of every requirement comprises:
dividing all the requirements of the system into 4 layers that include a user problem (PB) layer, a system feature (SF) layer, a system requirement (SR) layer and an allocated requirement (AR) layer,
wherein the PB layer is the highest layer, the SF layer is subordinate to the PB layer, the SR layer is subordinate to the SF layer, and the AR layer is subordinate to the SR layer,
wherein the PB layer is a requirement embodying a special concern of a user service,
wherein the SF layer is a requirement which is of a great value and is provided by the system to solve a user problem,
wherein the SR layer is all functional and non-functional requirements provided by the system externally, and wherein the AR layer is requirements which are obtained by decomposing system requirements and are allocated to a subsystem or module level.

8. The requirement management method according to claim 5, wherein after dividing all requirements of a system into layers from top to bottom according to a service object, a value and granularity of every requirement, the method further comprises:

classifying, according to a full life cycle of the system, non-functional attributes of the requirements of every layer into three service classifications that include a product delivery category, a product operation category and a product evolution category, wherein the product delivery category represents a requirement arising in a process from completion of system development to delivery of the system to a user, wherein the product operation category represents a requirement arising in an operation and maintenance process after the system is delivered to the user, wherein the product evolution category represents a requirement arising in error correction, functional upgrading and product evolution processes of the system, and wherein each requirement of every layer corresponds to one service classification of the three service classifications, and all the requirements of every layer of the system comprise all service classifications of the different service classifications.

9. The requirement management method according to claim 8, wherein after classifying non-functional attributes of requirements of every layer into three service classifications, the method further comprises checking completeness of every requirement of all the requirements of the system, and if the non-functional attributes of all the requirements of the system do not comprise all service classifications of the three service classifications, sending prompt information to indicate that the requirements of the system fails in the completeness check.

10. A requirement management apparatus having a processor and further comprising:

a requirement dividing module configured to divide all requirements of a system into layers from top to bottom according to a service object, a value and granularity of every requirement;

a first direct progress rate obtaining module configured to obtain a direct progress rate of one of the requirements in the system, wherein the direct progress rate is a progress rate tested by using a test case directly associated with the one requirement;

a second direct progress rate obtaining module configured to obtain a direct progress rate of each requirement of all lower-layer requirements of the one requirement, wherein the direct progress rate of each requirement is a progress rate tested by using a test case directly associated with each requirement; and a requirement progress rate obtaining module configured to calculate a mean of direct progress rates of all the lower-layer requirements to obtain a verification progress rate of the one requirement and configured to perform a weighting operation on the direct progress rate and the verification progress rate of the one requirement to obtain a progress rate of the one requirement in the system, wherein the progress rate of the one requirement is calculated according to an equation:

$$F\_ProgressRate = F\_DirectProgressRate * X + F\_VerificationProgressRate * (1-X),$$

wherein F_ProgressRate is the progress rate of the one requirement, F_DirectProgressRate is the direct progress rate, F_VerificationProgressRate is the verification progress rate, and X is a set weight.

11. The requirement management apparatus according to claim 10, wherein the requirement dividing module is configured to divide all the requirements of the system into 4 layers that include a user problem (PB) layer, a system feature (SF) layer, a system requirement (SR) layer and an allocated requirement (AR) layer, wherein the PB layer is the highest layer, wherein the SF layer is subordinate to the PB layer, wherein the SR layer is subordinate to the SF layer, wherein the AR layer is subordinate to the SR layer, wherein the PB layer is a requirement embodying a special concern of a user service, wherein the SF layer is a requirement which is of a great value and is provided by the system to solve user problems, wherein the SR layer is all functional and non-functional requirements provided by the system externally, and wherein the AR layer is requirements which are obtained by decomposing system requirements and are allocated to a subsystem or module level.

12. The requirement management apparatus according to claim 10, further comprising:

a requirement classification module configured to classify, according to a full life cycle of the system, non-functional attributes of requirements of every layer into three service classifications that include a product delivery category, a product operation category and a product evolution category, wherein the product delivery category represents a requirement arising in a process from completion of system development to delivery of the system to a user, wherein the product operation category represents a requirement arising in an operation and maintenance process after the system is delivered to the user, wherein the product evolution category represents a requirement arising in error correction, functional upgrading and product evolution processes of the system, and wherein each requirement of requirements of every layer corresponds to one service classification of the different service classifications, and all the requirements of every layer of the system comprise all service classifications of the different service classifications.

13. The requirement management apparatus according to claim 12, further comprising a requirement completeness checking module configured to check completeness of each requirement of all the requirements of the system, and if the non-functional attributes of all the requirements of the system do not comprise all service classifications of service classifications of every layer, send prompt information to indicate that the requirements of the system fail in the completeness check.

14. A requirement management apparatus having a processor and further comprising:

a requirement dividing module configured to divide all requirements of a system into layers from top to bottom according to a service object, a value and granularity of every requirement;

a first direct progress rate obtaining module configured to obtain a direct progress rate of one of the requirements in the system, wherein the direct progress rate is a progress rate tested by using a test case directly associated with the one requirement;

a second direct progress rate obtaining module configured to obtain a direct progress rate of each requirement of all lower-layer requirements of the one requirement, wherein the direct progress rate of each requirement is a progress rate tested by using a test case directly associated with each requirement; and a requirement progress rate obtaining module configured to calculate a mean of direct progress rates of all the lower-layer requirements to obtain a verification progress rate of the one requirement and configured to perform a weighting operation on the direct progress rate and the verification progress rate of the one requirement to obtain a progress rate of the one requirement in the system, wherein the requirement progress rate obtaining module is configured to calculate the verification progress rate F_VerificationProgressRate of the one requirement F according to an equation:

$$F\_VerificationProgressRate = \frac{\sum_{i=1}^{n} F_i\_ProgressRate}{n}; \text{ and}$$

calculate the progress rate F_ProgressRate of the one requirement F according to an equation:

$F\_ProgressRate = F\_DirectProgressRate*X + F\_VerificationProgressRate*(1-X),$ wherein n is the number of all the lower-layer requirements of the one requirement F, $F_i$ is an $i^{th}$ requirement of all the lower-layer requirements of the one requirement F, F_DirectProgressRate is the direct progress rate of F tested by using the test case directly associated with F, $F_i\_ProgressRate$ is a direct progress rate of $F_i$, and X is a set weight and has a value range of $0 <= X <= 1$.

15. The requirement management apparatus according to claim 14, wherein the requirement progress rate obtaining module is further configured to, after a direct progress rate of a lower-layer requirement $F_1$ of the one requirement F changes, calculate a progress rate $F_1\_ProgressRate$ of $F_1$ according to an equation:

$F_1\_ProgressRate = F_1\_ProgressRateOldValue + (F_1\_DirectProgressRateNewValue - F_1\_DirectProgressRateOldValue)*Y,$ and calculate the progress rate F_ProgressRate of the one requirement F according to an equation:

$F\_ProgressRate = F\_ProgressRateOldValue + (F_1\_ProgressRate - F_1\_ProgressRateOldValue)*(1-X)/n,$ wherein $F_1\_ProgressRateOldValue$ is a progress rate of $F_1$ before change, $F_1\_DirectProgressRateNewValue$ is a direct progress rate of $F_1$ after change, $F_1\_DirectProgressRateOldValue$ is a direct progress rate of $F_1$ before change, Y is a set weight and has a value range of $0 <= Y <= 1$, and F_ProgressRateOldValue is a progress rate of F before the lower-layer requirement $F_1$ changes; or when the number of lower-layer requirements of the one requirement F is increased from n to m, calculate a progress rate F_ProgressRate of F after the number of lower-layer requirements changes, according to an equation:

$$F\_ProgressRate = (n*F\_ProgressRateOldValue + (m-n)* F\_DirectProgressRate*X + (1-X)*\sum_{i=n+1}^{m} F_i\_Progress)/m,$$

wherein F_ProgressRateOldValue is a direct progress rate of F before the number of lower-layer requirements changes, and F_DirectProgressRate is a direct progress rate of F after the number of lower-layer requirements changes; or when the number of lower-layer requirements of the requirement F is reduced from n to k, calculate a progress rate F_ProgressRate of F after the number of lower-layer requirements changes, according to an equation:

$$F\_ProgressRate = (-n*F\_ProgressRateOldValue + (n-k)* F\_DirectProgressRate*X + (1-X)*\sum_{i=k+1}^{n} F_i\_Progress)/(-k).$$

16. The requirement management apparatus according to claim 14, wherein the requirement dividing module is configured to divide all the requirements of the system into 4 layers that include a user problem (PB) layer, a system feature (SF) layer, a system requirement (SR) layer and an allocated requirement (AR) layer, wherein the PB layer is the highest layer, wherein the SF layer is subordinate to the PB layer, wherein the SR layer is subordinate to the SF layer, wherein the AR layer is subordinate to the SR layer, wherein the PB layer is a requirement embodying a special concern of a user service, wherein the SF layer is a requirement which is of a great value and is provided by the system to solve user problems, wherein the SR layer is all functional and non-functional requirements provided by the system externally, and wherein the AR layer is requirements which are obtained by decomposing system requirements and are allocated to a subsystem or module level.

17. The requirement management apparatus according to claim 14, further comprising:

a requirement classification module configured to classify, according to a full life cycle of the system, non-functional attributes of requirements of every layer into three service classifications that include a product delivery category, a product operation category and a product evolution category, wherein the product delivery category represents a requirement arising in a process from completion of system development to delivery of the system to a user, wherein the product operation category represents a requirement arising in an operation and maintenance process after the system is delivered to the user, wherein the product evolution category represents a requirement arising in error correction, functional upgrading and product evolution processes of the system, and wherein each requirement of requirements of every layer corresponds to one service classification of the different service classifications, and all the requirements of every layer of the system comprise all service classifications of the different service classifications.

18. The requirement management apparatus according to claim 17, further comprising a requirement completeness checking module configured to check completeness of each requirement of all the requirements of the system, and if the non-functional attributes of all the requirements of the system do not comprise all service classifications of service classifications of every layer, send prompt information to indicate that the requirements of the system fail in the completeness check.

* * * * *